US011613431B2

(12) United States Patent
Marx

(10) Patent No.: US 11,613,431 B2
(45) Date of Patent: Mar. 28, 2023

(54) FASTENER FEEDING SYSTEM AND METHOD

(71) Applicant: KUKA Systems North America LLC, Sterling Heights, MI (US)

(72) Inventor: Timothy James Marx, Macomb, MI (US)

(73) Assignee: KUKA Systems North America LLC, Sterling Heights, MI (US)

( * ) Notice: Subject to any disclaimer, the term of this patent is extended or adjusted under 35 U.S.C. 154(b) by 372 days.

(21) Appl. No.: 16/863,499

(22) Filed: Apr. 30, 2020

(65) Prior Publication Data

US 2021/0339965 A1 Nov. 4, 2021

(51) Int. Cl.
*G06F 7/00* (2006.01)
*B65G 47/90* (2006.01)
*B23P 21/00* (2006.01)
*B25J 9/16* (2006.01)

(52) U.S. Cl.
CPC .......... *B65G 47/905* (2013.01); *B23P 21/004* (2013.01); *B25J 9/1694* (2013.01)

(58) Field of Classification Search
CPC ..... B65G 47/905; B65G 54/02; B23P 21/004; B23P 19/008; B23P 19/004; B25J 9/1694
USPC ......................................... 700/213, 228, 230
See application file for complete search history.

(56) References Cited

U.S. PATENT DOCUMENTS

| | | | |
|---|---|---|---|
| 4,894,908 A | 1/1990 | Haba, Jr. et al. | |
| 6,328,523 B1 | 12/2001 | Watanabe et al. | |
| 6,481,560 B2 | 11/2002 | Kearney | |
| 8,240,461 B2 | 8/2012 | Asano et al. | |
| 2003/0208302 A1* | 11/2003 | Lemelson | G05B 19/19 700/245 |
| 2009/0118858 A1 | 5/2009 | Wallace et al. | |
| 2011/0018291 A1 | 1/2011 | Osada et al. | |
| 2015/0259017 A1 | 9/2015 | Laurence et al. | |
| 2017/0348857 A1* | 12/2017 | Vasquez | B25J 9/0084 |

(Continued)

FOREIGN PATENT DOCUMENTS

| | | |
|---|---|---|
| CN | 102581605 B | 4/2014 |
| CN | 209157571 U | 7/2019 |

(Continued)

OTHER PUBLICATIONS

U.S. Patent Office; Search Report and Written Opinion in related International Patent Application No. PCT/US2021/028578 dated Jul. 20, 2021; 13 pages.

*Primary Examiner* — Yolanda R Cumbess
(74) *Attorney, Agent, or Firm* — Dorton & Willis, LLP

(57) ABSTRACT

A fastener feeding system and method for automatically delivering fasteners to a plurality of different manufacturing cells in a manufacturing line from a single load point. The fastener feeding system includes a fastener distribution assembly and a transport assembly for selecting and delivering fasteners to the manufacturing cells. Individual fasteners are selected from a fastener reservoir by a robotic manipulator of the fastener distribution assembly, and are placed on a fastener carrier supported on conveying structure extending between the fastener distribution assembly and the manufacturing cells for movement therealong. The fastener carrier is controlled to move along the track to deliver one or more fasteners to a manufacturing cell.

16 Claims, 7 Drawing Sheets

(56) References Cited

U.S. PATENT DOCUMENTS

| | | | | |
|---|---|---|---|---|
| 2020/0130189 A1* | 4/2020 | Ghanem | ................ | B25J 9/1612 |
| 2020/0216264 A1* | 7/2020 | Martinez | .............. | B65G 1/1373 |
| 2020/0223064 A1* | 7/2020 | Zak | ........................ | B25J 9/1612 |
| 2021/0308866 A1* | 10/2021 | Zhu | ........................ | B25J 9/1697 |

FOREIGN PATENT DOCUMENTS

| | | |
|---|---|---|
| JP | 2011000702 A | 1/2011 |
| WO | 2011119586 A2 | 9/2011 |

* cited by examiner

FASTENER FEEDING SYSTEM AND METHOD

TECHNICAL FIELD

The present invention relates generally to automated manufacturing systems and, more particularly, to a system and method for automated distribution of fasteners in a manufacturing facility.

BACKGROUND

Modern manufacturing systems are configured for automated assembly of products such as automobiles, aircraft, appliances, and various other goods. Such manufacturing systems typically comprise several manufacturing cells arranged along an assembly line, wherein each cell may include one or more multi-axis robotic manipulators configured to perform various assembly or processing functions. In some manufacturing systems, the robotic manipulators may be configured to assemble components of a product using fasteners such as screws, bolts, rivets, etc. Typically, individual robotic manipulators may be supplied with fasteners from magazines located at the respective manufacturing cells. When the fasteners in the magazine are depleted, the magazine must be replenished or replaced, requiring that the work on the manufacturing line be stopped to allow for such replenishment or replacement. A need exists for an improved system and method for supplying various fasteners to different manufacturing cells of a manufacturing facility that overcomes these and other drawbacks of conventional systems.

SUMMARY

The present invention provides a fastener feeding system and associated method for automatically delivering fasteners to a plurality of different manufacturing cells in a manufacturing line from a single load point. While the invention will be described in connection with certain embodiments, it will be understood that the invention is not limited to these embodiments. Rather, the invention includes all alternatives, modifications, and equivalents as may be included within the spirit and scope of the present disclosure.

In one aspect, an exemplary fastener feeding system for use with a manufacturing facility having a plurality of manufacturing cells includes a fastener distribution assembly and a transport assembly for selecting and delivering fasteners to the plurality of manufacturing cells. The fastener distribution assembly includes a robotic manipulator and at least one fastener reservoir proximate the robotic manipulator. The transport assembly includes conveying structure, such as a track, extending between the fastener distribution assembly and the plurality of manufacturing cells. Individual fasteners are selected from the fastener reservoir by the robotic manipulator and are placed on a fastener carrier supported on the track for movement therealong. The fastener carrier is controlled to move along the track to deliver one or more fasteners to a manufacturing cell.

In another aspect, the fastener distribution assembly further includes a sensor assembly associated with the robotic manipulator and configured to detect individual fasteners in the fastener reservoir. Information received from the sensor assembly may be used to select a fastener from the fastener reservoir for placement on the fastener carrier. In another aspect, selection of fasteners from the fastener reservoir is based on information related to a demand for fasteners at one or more of the manufacturing cells.

In another aspect, a method for providing fasteners to a plurality of manufacturing cells within a manufacturing facility includes selecting at least one fastener from a fastener reservoir of a fastener distribution assembly using a robotic manipulator and placing the fastener on a fastener carrier using the robotic manipulator. The method further includes controlling movement of the fastener carrier along conveying structure, such as a track, extending between the fastener distribution assembly and the manufacturing cells to deliver the fastener to at least one of the manufacturing cells.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
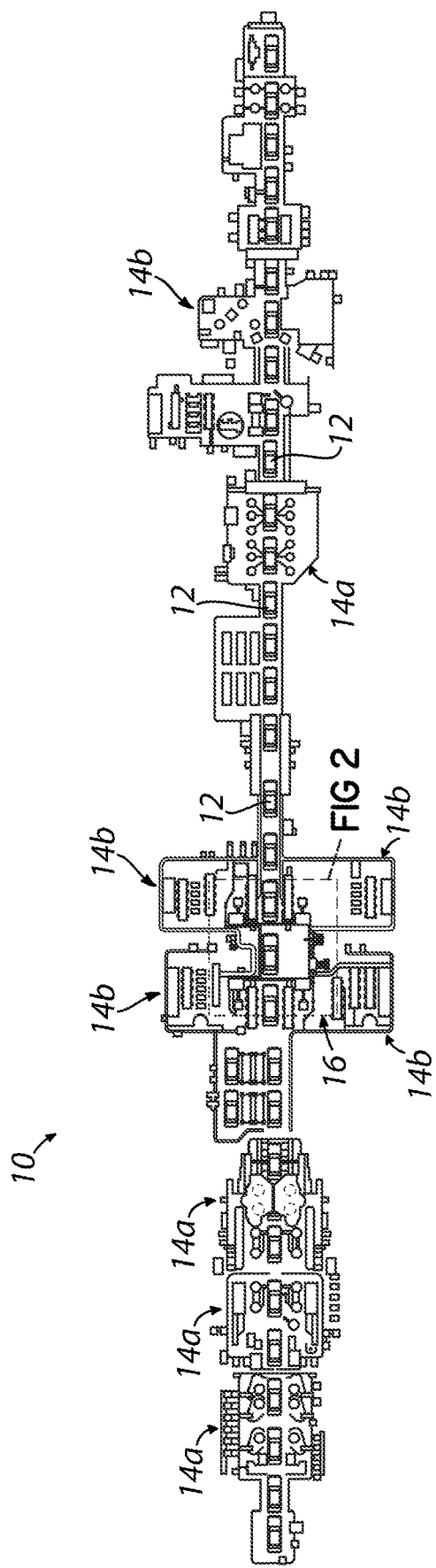
FIG. 1 is a schematic illustration of an exemplary manufacturing line in a manufacturing facility, including an exemplary fastener feeding system in accordance with the principles of the present disclosure.

FIG. 1 depicts an exemplary manufacturing line 10 within a manufacturing facility for assembling a product. In the embodiment shown and described herein, the manufacturing line 10 is configured to assemble an automobile 12, however, it will be appreciated that a manufacturing line 10 in accordance with the present disclosure may alternatively be configured to assemble various other products. The manufacturing line 10 of the embodiment depicted in FIG. 1 includes a plurality of manufacturing cells 14a, 14b distributed at various locations along the manufacturing line 10 for assembling components or performing other processing steps involved in manufacturing the automobile 12. At least some of the manufacturing cells 14b include automated equipment, particularly multi-axis robotic manipulators, for assembling components or performing processing steps. The manufacturing line 10 further includes an exemplary fastener feeding system 16 in accordance with the principles of the present disclosure and configured to automatically deliver fasteners to the respective manufacturing cells 14b of the manufacturing line 10 from a single load point.

Figure 2:
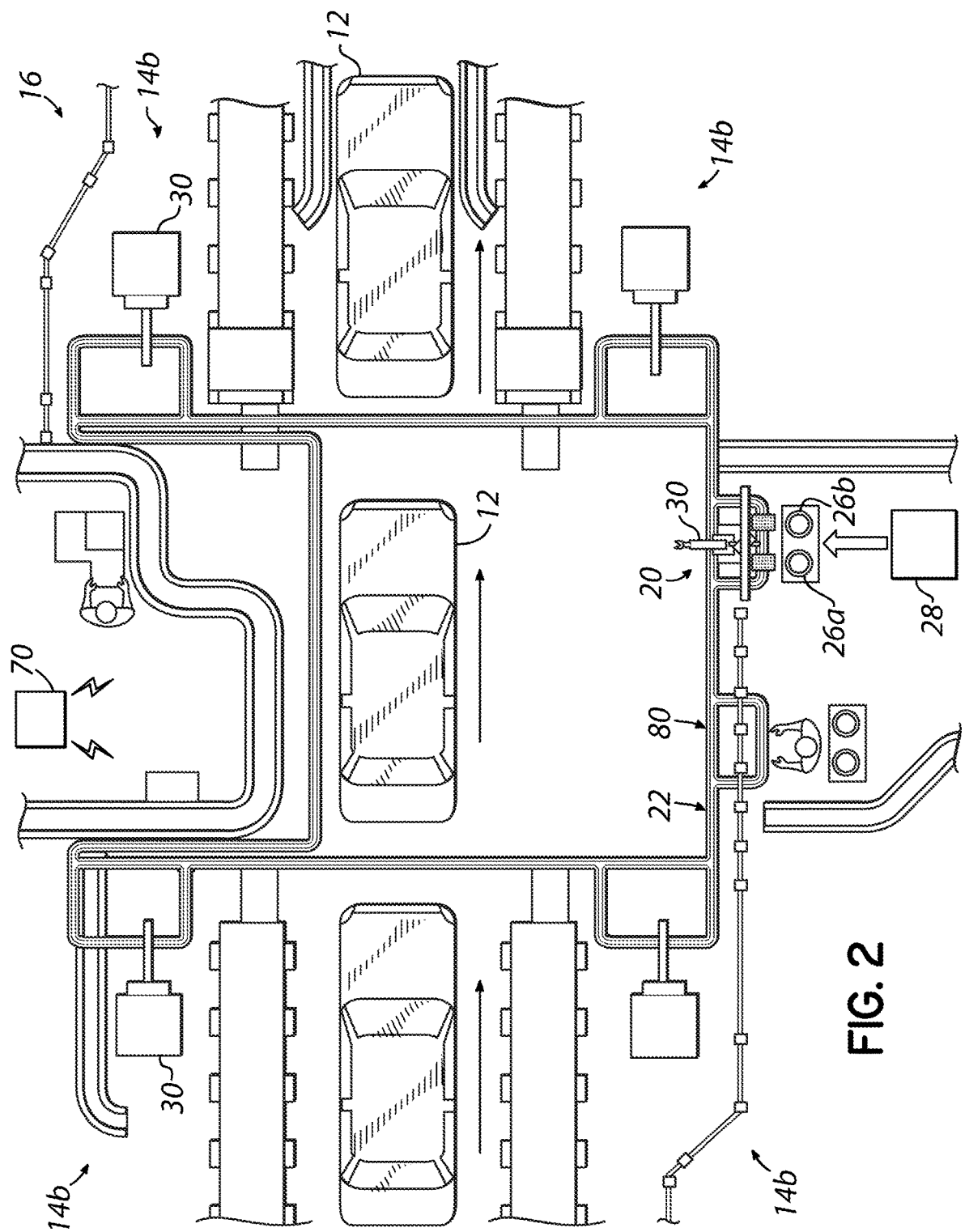
FIG. 2 is an enlarged detail view of the encircled area of FIG. 1.
Figure 3:
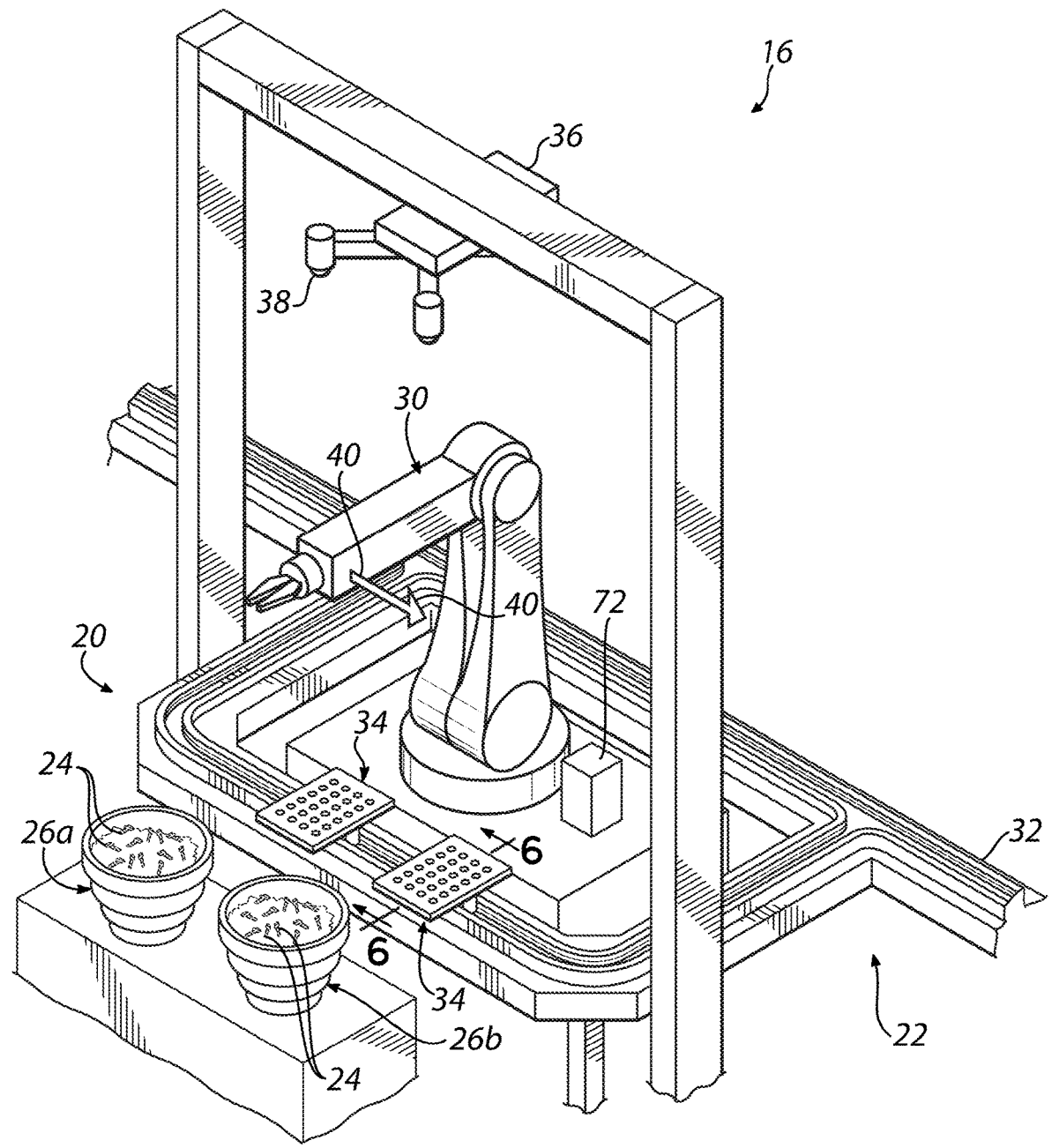
FIG. 3 is a perspective view of an exemplary fastener distribution assembly and a portion of a transport assembly of a fastener feeding system in accordance with the principles of the present disclosure.
Figure 4A:
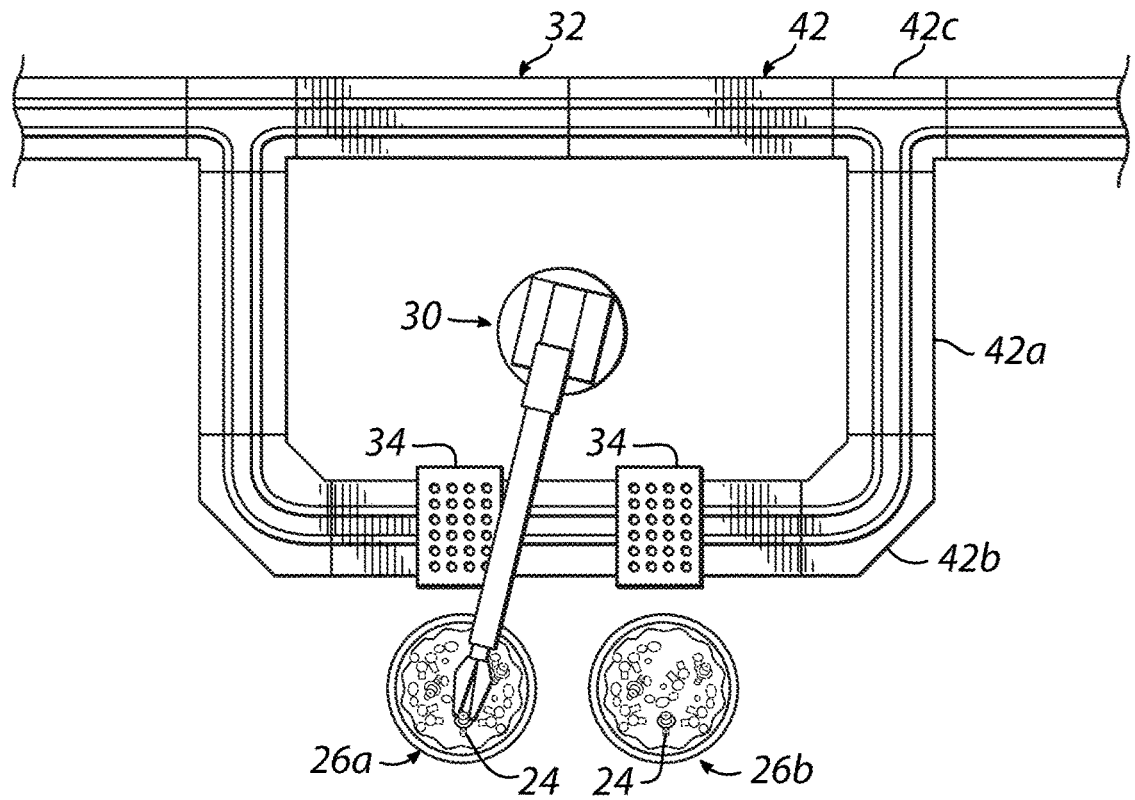
FIGS. 4A-4D illustrate operation of the exemplary fastener feeding system to select and place fasteners on fastener carriers.
Figure 4B:
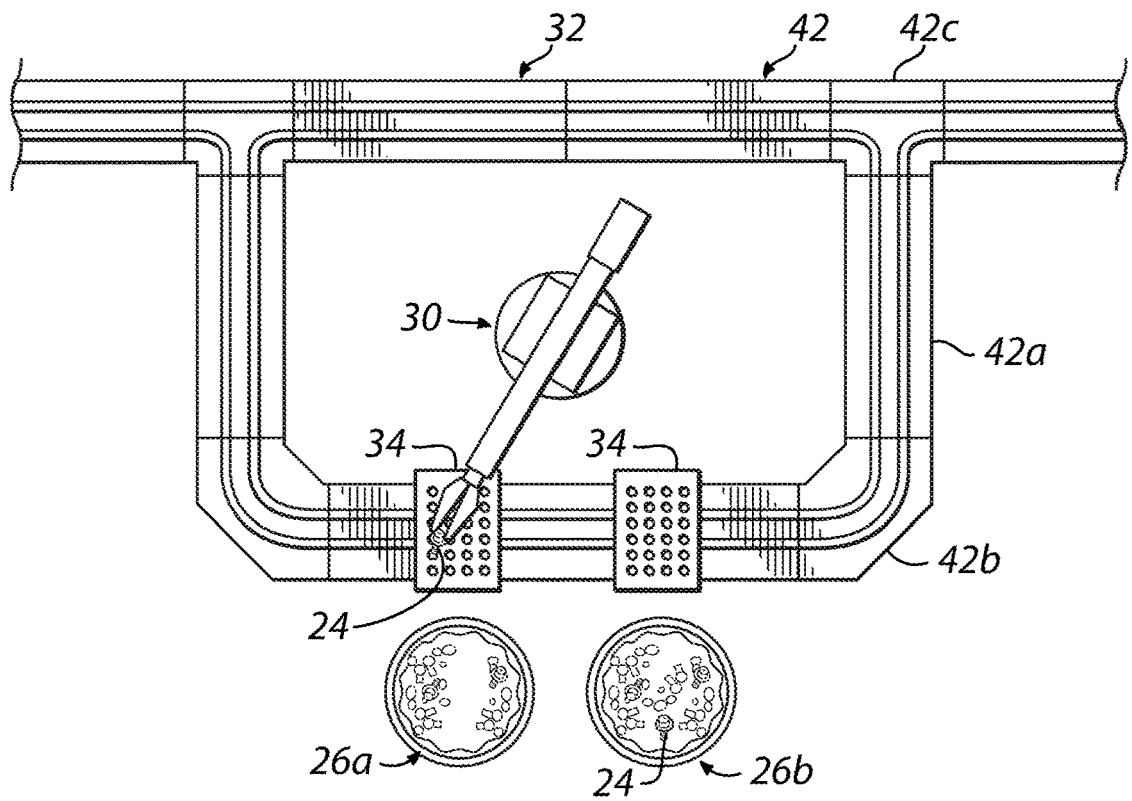
Figure 4C:
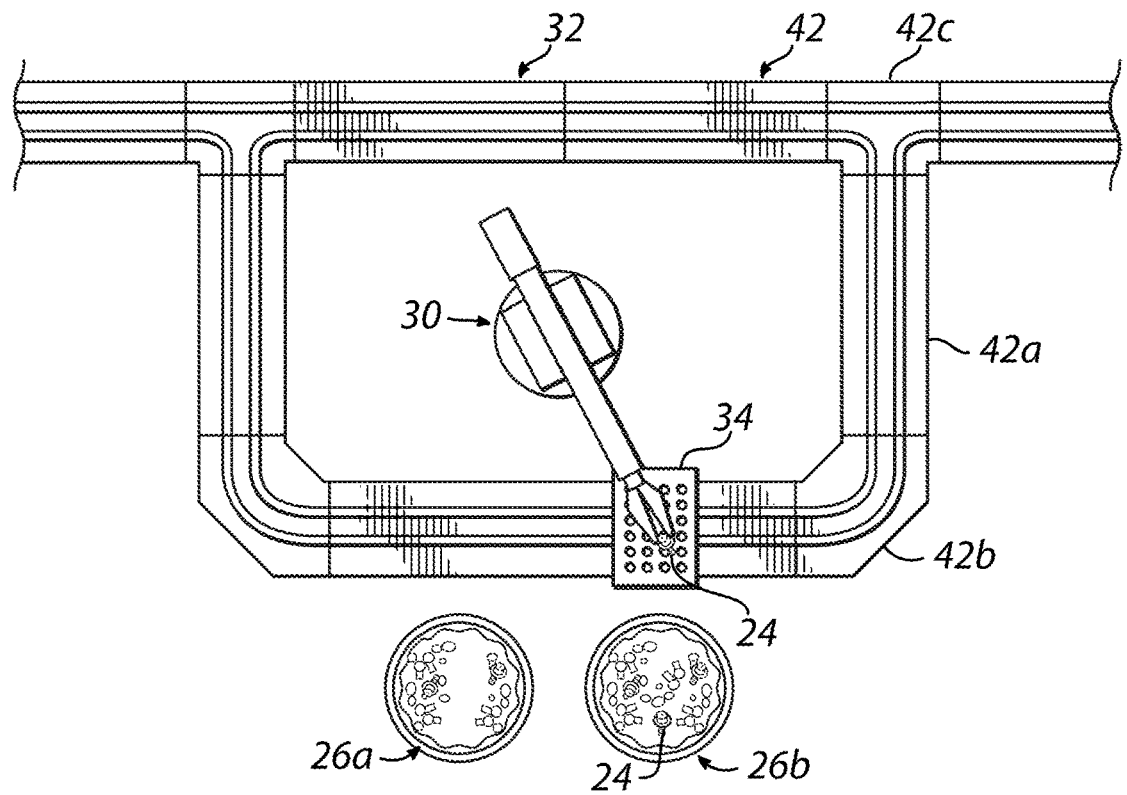
Figure 4D:
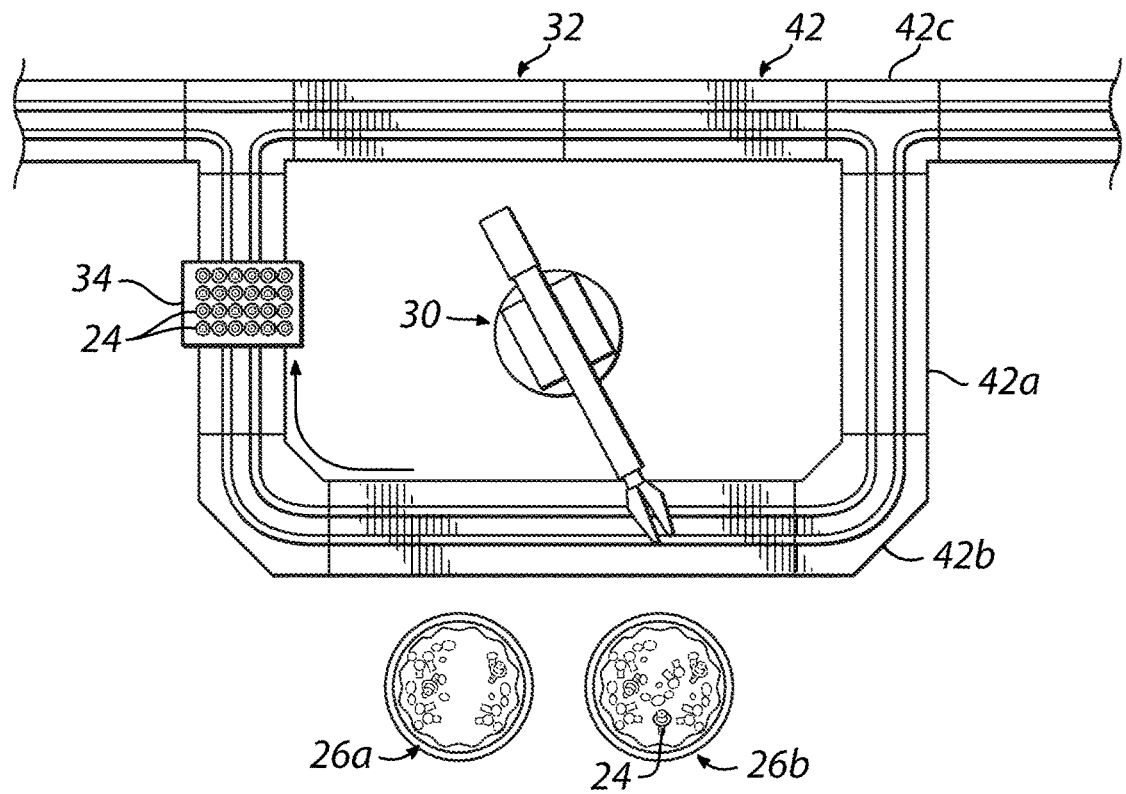

With continued reference to FIG. 1, and referring further to FIGS. 2 and 3, the exemplary fastener feeding system 16 includes a fastener distribution assembly 20 and a transport assembly 22 configured to deliver fasteners 24 from the fastener distribution assembly 20 to the plurality of manufacturing cells 14*b*. The fastener distribution assembly 20 includes one or more fastener reservoirs 26*a*, 26*b* configured to receive a plurality of one or more types of fasteners 24 from a supply 28. The one or more types of fasteners 24 may be different types of fasteners, such as screws, bolts, or rivets, and/or may be different sizes or lengths of fasteners of the same type. Different types, sizes, or lengths of fasteners 24 may be provided in a single reservoir 26*a*, 26*b*, or separate reservoirs 26*a*, 26*b* may be used to receive fasteners 24 sorted by type, size, or length.

The fastener distribution assembly 20 further includes a multi-axis robotic manipulator 30 positioned adjacent the one or more fastener reservoirs 26*a*, 26*b*, whereby the robotic manipulator 30 may select individual fasteners 24 from the one or more fastener reservoirs 26*a*, 26*b* to be delivered to an appropriate manufacturing cell 14*b*. The transport assembly 22 includes conveying structure that defines a path extending between the fastener distribution assembly 20 and the plurality of manufacturing cells 14*b*. The conveying structure may be any structure suitable for facilitating the transport of fasteners 24 to the manufacturing cells 14*b* of the manufacturing line. In some embodiments, for example, the conveying structure may comprise one or more driven belts or driven chains that may be routed along one or more paths between the fastener distribution assembly 20 and the plurality of manufacturing cells 14*b*. One or more fastener carriers may be supported on the conveying structure for receiving one or more fasteners 24 selected by the robotic manipulator 30 for delivery to an appropriate manufacturing cell 14*b*.

In the embodiment shown and described herein, the conveying structure of the transport assembly 22 comprises a track 32 that extends between the fastener distribution assembly 20 and the plurality of manufacturing cells 14*b*. One or more fastener carriers 34 are supported on the track 32 and are configured to receive one or more fasteners 24 selected by the robotic manipulator 30 for delivery to an appropriate manufacturing cell 14*b*.

The fastener distribution assembly 20 further includes a sensor assembly 36 associated with the robotic manipulator 30 and configured to detect individual fasteners 24 located in the one or more fastener reservoirs 26*a*, 26*b*. Information related to the fasteners 24 detected by the sensor assembly 36 may be used by the robotic manipulator 30 to select the individual fasteners 24 from the one or more reservoirs 26*a*, 26*b*. In the embodiment shown, the sensor assembly 36 includes a vision system 38 comprising one or more cameras positioned at a location suitable for detecting fasteners 24 in the one or more reservoirs 26*a*, 26*b*. In one embodiment, one or more of the cameras of the vision system 38 may comprise a 3-D Vision-Guidance Robotics Camera model number RB-500 available from Keyence Corporation of America, Itasca, Ill. Information about the fasteners 24 that may be detected by the vision system 38 may include fastener type, fastener size and length, and the position and/or orientation of the fastener 24 in the respective reservoir 26*a*, 26*b*.

In one embodiment, the fastener distribution assembly 20 may further include a marker 40 associated with the robotic manipulator 30 and configured to facilitate detection of a pose of the robotic manipulator 30 using the vision system 38 or other suitable sensors. Information related to the pose of the robotic manipulator 30 may be used to facilitate calibration of the robotic manipulator 30, as may be desired.

With continued reference to FIG. 3, and referring further to FIGS. 4A-4D, the robotic manipulator 30 may also be configured to select individual fasteners 24 from the one or more fastener reservoirs 26*a*, 26*b* based on information related to a demand for fasteners 24 at the various manufacturing cells 14*b*, as generally depicted in FIGS. 4A-4D. Information related to the demand for fasteners 24 may be obtained from various sources, such as build instructions for a specific product or component being assembled or processed on the manufacturing line 10. Information related to the demand for fasteners 24 may alternatively be derived from information detected or determined at each manufacturing cell 14*b* regarding the number of fasteners 24 of a particular type, size, and/or length currently at the manufacturing cell 14*b*.

In the embodiment shown, the transport assembly 22 includes a track 32 that is flexibly configurable to extend to and between the distribution assembly 20 and any number of manufacturing cells 14*b*, and which can be quickly and easily reconfigured as needed to accommodate changes in the arrangement and configuration of manufacturing cells 14*b* in the manufacturing line 10. To this end, the track 32 comprises a plurality of relatively short length track segments 42 that can be easily arranged and coupled together in an end-to-end fashion in order to route the track 32 along any desired path in order to accommodate changes to the manufacturing line 10. In one embodiment, the track segments 42 may be provided in lengths such as 0.25 meter or 1.0 meter straight segments 42*a*, for example, and in 90-degree turns 42*b*, and switch segments 42*c* to facilitate easy reconfiguration. Each track segment 42 includes at least one linear motor 44 (see FIG. 6) coupled with the track segment 42 to provide the motive force for moving the fastener carriers 34 along the assembled track 32.

Figure 5:
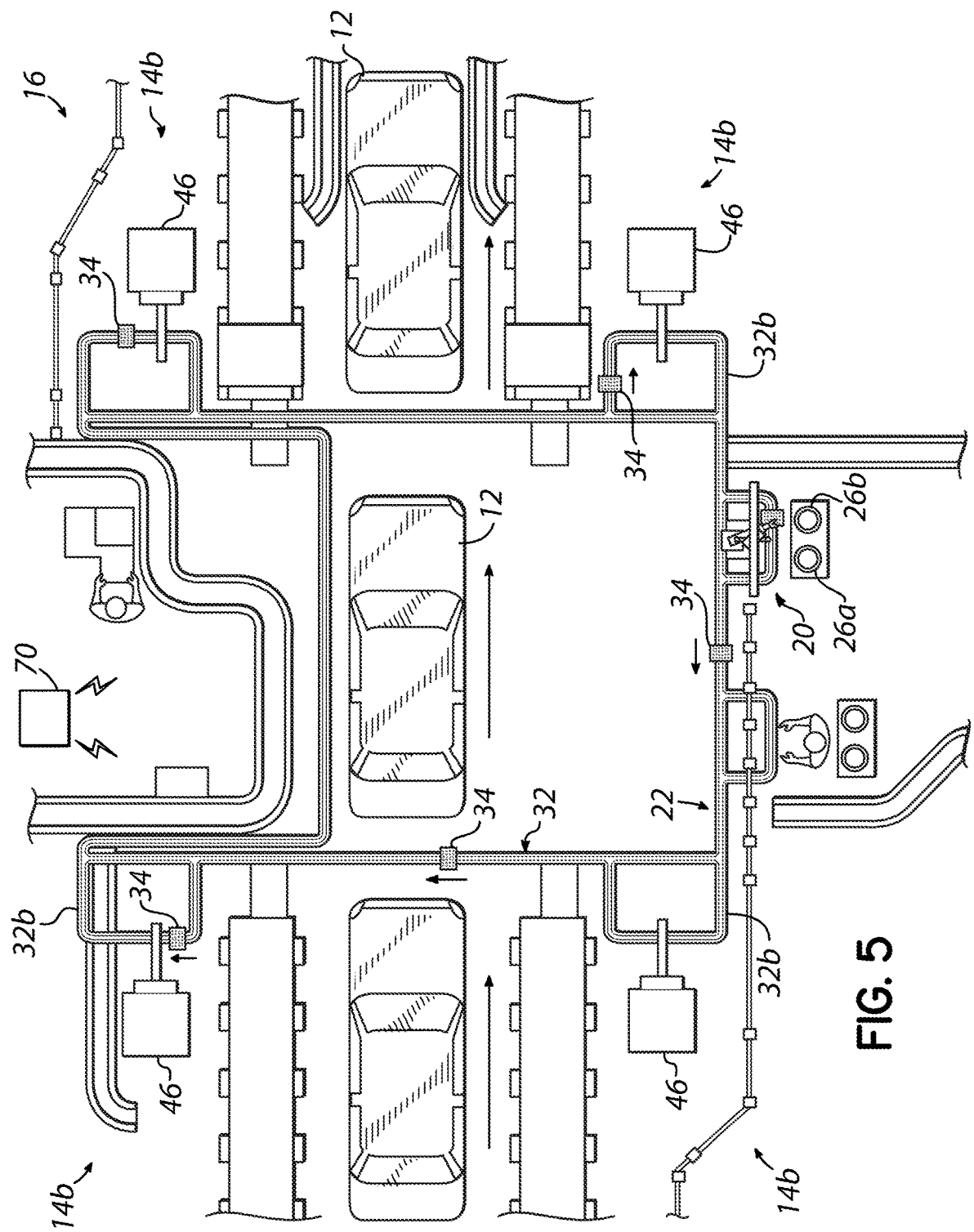
FIG. 5 is a schematic illustration depicting operation of the exemplary fastener feeding system to deliver fasteners to manufacturing cells on fastener carriers.

With reference to FIG. 5, the track 32 may be configured to facilitate movement of individual fastener carriers 34 along a main loop 32*a* having a path that passes next to each of the manufacturing cells 14*b*. Adjacent each of the manufacturing cells 14*b*, the track 32 may include a respective pick spur 32*b* where a given fastener carrier 34 may be routed into a pick zone within the working space of a robotic manipulator 46 associated with that manufacturing cell 14*b*.

Figure 6:
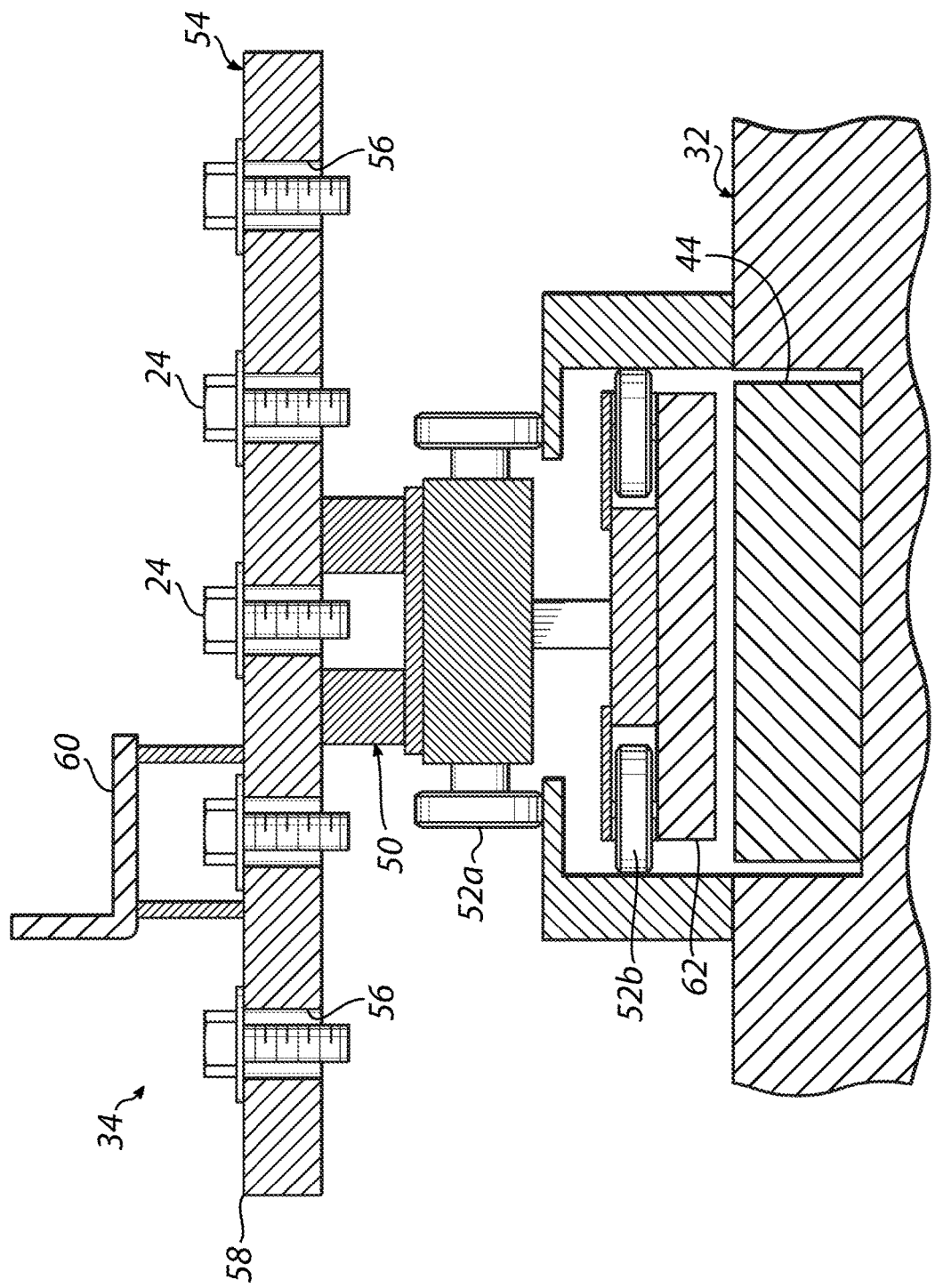
FIG. 6 is a partial cross-sectional view illustrating an exemplary fastener carrier supported on the track.

As depicted in FIGS. 3 and 6, an exemplary fastener carrier 34 includes a carrier body 50 having a plurality of wheels 52*a*, 52*b* arranged on the carrier body 50 and configured to operatively engage the track 32 to facilitate movement of the carrier 34 therealong. In the embodiment shown, the carrier body 50 includes a plurality of first wheels 52*a* having generally horizontally arranged rotation axes for supporting the fastener carrier 34 for rolling movement along the track 32, and a plurality of second wheels 52*b* having generally vertically arranged rotation axes for maintaining an orientation of the fastener carrier 34 on the track 32 and for guiding the fastener carrier 34 within the track 32. The fastener carrier 34 further includes a fastener support 54, or nest, configured to receive and support fasteners 24 placed on the carrier 34 by the robotic manipulator 30 of the fastener distribution assembly 20. In the embodiment shown, the fastener support 54 includes a plurality of apertures 56 configured and arranged to receive the shank portions of one or more fasteners 24 in the form of bolts at distinct positions and orientations on the fastener support 54 to facilitate eventual removal of the fasteners 24 from the carrier 34 at an appropriate manufacturing cell 14*b*. While the exemplary fastener support 54 has been shown and described herein as including a plurality of apertures 56 for supporting fasteners 24 at distinct positions and orientations, it will be appreciated that the fastener support 54, or nest, may have various other configurations suitable for supporting fasteners 24 at distinct positions and orientations, including, but not limited to slots, spaced apart rods or rails, or other suitable structure.

The fastener carrier 34 may further include one or more features configured to facilitate detecting the position of the fastener carrier 34 and/or fastener support 54 relative to the robotic manipulator 30, and/or to facilitate detecting the position of fasteners 24 supported on the fastener support 54. Information related to the detected positions may be used to facilitate the placement of fasteners 24 onto and/or the removal of fasteners 24 from the fastener support 54. For example, one or more corners 58 of the fastener support 54 and/or one or more apertures 56 in the fastener support 54 may serve as features configured to facilitate detecting the position of the fastener carrier 34 and/or fastener support 54. Such features may be detected using the vision system 38, for example, or using other suitable sensors. Once the position of the fastener carrier 34 and/or fastener support 54 is detected, the position of the plurality of apertures 56 for receiving and supporting fasteners 24 may thereafter be determined from the known geometry of the fastener support 54.

In one embodiment, one or more of the fastener carriers 34 may also be configured to receive and support a component that may be associated with one or more of the fasteners 24 that are to be delivered to a manufacturing cell 14b. As a non-limiting example, a fastener carrier 34 may be configured to receive and support a bracket 60 that will be installed with one or more fasteners 24 that are placed onto the fastener carrier 34 so that the bracket 60 and associated fasteners 24 may be delivered together to an appropriate manufacturing cell 14b. Each fastener carrier 34 further includes at least one permanent magnet 62 coupled with the carrier body 50 and positioned and arranged to cooperate with the linear motors 44 of the plurality of track segments 42, so that the fastener carrier 34 may be precisely moved along the track 32 and precisely positioned at a desired location on the track 32 corresponding to a manufacturing cell 14b.

The fastener feeding system 16 further includes one or more controllers 70 for controlling operation of the fastener feeding system 16 to deliver appropriate fasteners 24 to the one or more manufacturing cells 14b. In this regard, all functions relating to operation of the fastener feeding system 16 may be housed in a single controller unit 17, or several controller units may be provided for handling various functions of the fastener feeding system 16 in cooperation with one another. For example, the robotic manipulator 30 of the fastener distribution assembly 20 may utilize a separate robotic controller 72 communicating with a system controller 70 that handles other operations of the fastener feeding system 16 to coordinate the selection and placement of desired fasteners 24 on one or more fastener carriers 34 for delivery to respective manufacturing cells 14b by the transport assembly 22. The system controller 70 may also be configured to communicate with the plurality of linear motors 44 of the track segments 42 to monitor and control movement of the respective fastener carriers 34 along the track 32. The system controller 70 and/or the robotic controller 72 may also receive signals from various sensors of the fastener feeding system 16, including the sensor assembly 36 of the fastener distribution assembly 20, to coordinate operation of the robotic manipulator 30 and transport assembly 22 to select and deliver fasteners 24 to one or more of the manufacturing cells 14b of the manufacturing line 10 based on a demand for fasteners 24 at the respective manufacturing cells 14b.

In use, a fastener feeding system 16 in accordance with the principles of the present disclosure may operate to provide fasteners 24 to a plurality of manufacturing cells 14b within a manufacturing facility 10 by selecting at least one fastener 24 from a fastener reservoir 26a, 26b at a fastener distribution assembly 20 using a robotic manipulator 30. In one embodiment, the selection of at least one fastener 24 from the fastener reservoir 26a, 26b may be based on a demand for fasteners 24 at a manufacturing cell 14b. The robotic manipulator 30 may then place the at least one fastener 24 on a fastener carrier 34 for delivery to a manufacturing cell 14b, and movement of the fastener carrier 34 along a track 32 that extends to and between the fastener distribution assembly 20 and at least one of the plurality of manufacturing cells 14b may be controlled to deliver the fastener 24 to one of the plurality of manufacturing cells 14b. The robotic manipulator 30 may be controlled such that the fastener 24 may be placed on the fastener carrier 34 in a defined position and orientation, for example a defined position and orientation relative to a feature on the fastener carrier 34 and/or a fastener support 54 of the fastener carrier 34. The method may further include detecting an individual fastener 24 within a fastener reservoir 26a, 26b with a sensor assembly 36, and selecting the fastener 24 from the fastener reservoir 26a, 26b based on information received from the sensor assembly 36.

With reference to FIG. 2, a fastener feeding system 16 in accordance with the principles of the present disclosure may further include a manual load station 80 positioned along the track 32 to facilitate manual loading of fasteners 24 onto fastener carriers 34 in the event of a malfunction or other occurrence that inhibits the operation of the robotic manipulator 30 to automatically select and load fasteners 24 onto fastener carriers 34 as generally described above. The system controller 70 may continue to control the movement of fastener carriers 34 from the manual load station 80 to deliver fasteners 24 to appropriate manufacturing cells 14b.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A fastener feeding system for a manufacturing facility having a plurality of manufacturing cells, the fastener feeding system comprising:
   a fastener distribution assembly, comprising:
     a robotic manipulator,
     at least one fastener reservoir proximate the robotic manipulator and configured to receive a plurality of one or more types of fasteners from a supply,
     a sensor assembly associated with the robotic manipulator and configured to detect individual fasteners in the at least one fastener reservoir, the robotic manipulator adapted to select individual fasteners from the at least one fastener reservoir based on information received from the sensor assembly;
a transport assembly, comprising:
conveying structure defining a path extending between the fastener distribution assembly and the plurality of manufacturing cells,
one or more fastener carriers supported on the conveying structure for movement along the path; and
a controller communicating with the robotic manipulator and the transport assembly;
the controller controlling movement of the one or more fastener carriers to and between the fastener distribution assembly and the plurality of manufacturing cells whereby selected fasteners are delivered to the plurality of manufacturing cells.

2. The fastener feeding system of claim 1, wherein:
the conveying structure comprises a track extending between the fastener distribution assembly and the plurality of manufacturing cells; and
the one or more fastener carriers are supported on the track for movement therealong.

3. The fastener feeding system of claim 2, wherein:
the track comprises a plurality of track segments aligned end-to-end;
each track segment includes at least one linear motor; and
each carrier includes at least one permanent magnet cooperating with the linear motors of the track segments to move the carrier along the respective track segments;
the linear motors of the plurality of track segments controlled by the controller to cooperate with the at least one permanent magnet of each fastener carrier to thereby precisely move the fastener carrier along the track and precisely position the fastener carrier at a desired location on the track.

4. The fastener feeding system of claim 1, wherein the controller is configured to control the robotic manipulator and movement of the one or more fastener carriers based on information related to a demand for fasteners at one or more of the manufacturing cells.

5. The fastener feeding system of claim 1, wherein the sensor assembly comprises a vision system.

6. The fastener feeding system of claim 5, wherein the vision system comprises at least one of:
at least one camera configured to detect visual information related to fasteners in the at least one fastener reservoir; or
a marker associated with the robotic manipulator and configured to facilitate calibration of the robotic manipulator with the at least one camera.

7. The fastener feeding system of claim 1, wherein at least one carrier comprises a nest configured to support a plurality of fasteners thereon, such that each fastener on the carrier is supported at a defined position and orientation.

8. The fastener feeding system of claim 7, wherein the nest is configured to support each fastener at a defined position and orientation relative to a feature on at least one of the nest or the carrier.

9. The fastener feeding system of claim 1, wherein at least one carrier is configured to support at least one fastener and at least one component associated with the at least one fastener.

10. A method of providing fasteners to a plurality of manufacturing cells within a manufacturing facility, the method comprising:
detecting an individual fastener in a fastener reservoir at a fastener distribution assembly with a sensor assembly associated with a robotic manipulator;
selecting at least one fastener from the fastener reservoir using the robotic manipulator;
wherein selecting the fastener from the fastener reservoir comprises selecting the fastener based on information received from the sensor assembly;
placing the at least one fastener on a fastener carrier using the robotic manipulator; and
controlling movement of the fastener carrier along a conveying structure extending between the fastener distribution assembly and at least one of the plurality of manufacturing cells to thereby deliver the fastener to at least one of the plurality of manufacturing cells.

11. The method of claim 10, wherein:
the sensor assembly comprises a vision system including at least one camera configured to detect visual information related to the at least one fastener in the fastener reservoir; and
selecting the fastener from the fastener reservoir comprises selecting the fastener based on the visual information.

12. A method of providing fasteners to a plurality of manufacturing cells within a manufacturing facility, the method comprising:
selecting at least one fastener from a fastener reservoir at a fastener distribution assembly using a robotic manipulator;
placing the at least one fastener on a fastener carrier using the robotic manipulator; and
controlling movement of the fastener carrier along a conveying structure extending between the fastener distribution assembly and at least one of the plurality of manufacturing cells to thereby deliver the fastener to at least one of the plurality of manufacturing cells;
wherein the conveying structure comprises a track with a plurality of track segments, each track segment including at least one linear motor;
wherein the fastener carrier includes at least one permanent magnet cooperating with the at least one linear motor of the track segments to move the fastener carrier along the track segments; and
wherein controlling movement of the fastener carrier along the track comprises selectively energizing the linear motors of the track segments to precisely move the fastener carrier along the track and precisely position the fastener carrier at a desired location on the track.

13. The method of claim 12, wherein placing the fastener on the fastener carrier comprises placing the fastener on the fastener carrier in a defined position and orientation.

14. The method of claim 13, wherein placing the fastener on the fastener carrier comprises placing the fastener on the fastener carrier in a defined position and orientation relative to relative to a feature on at least one of the fastener carrier or a fastener nest on the fastener carrier.

15. The method of claim 12, further comprising:
supporting at least one component on at least one fastener carrier together with at least one fastener associated with the at least one component.

16. The method of claim 12, further comprising:
obtaining information related to a demand for fasteners at one or more of the manufacturing cells;
controlling operation of the robotic manipulator to select and place at least one fastener on a fastener carrier in response to the information; and controlling movement of the fastener carrier on the conveying structure to deliver the at least one fastener to one of the plurality of manufacturing cells in response to the information.

* * * * *